United States Patent [19]

Hess

[11] 4,405,980

[45] Sep. 20, 1983

[54] PROCESS CONTROL COMPUTER WHEREIN DATA AND ADDRESSES ARE SEPARATELY PROCESSED

[76] Inventor: Bruno M. Hess, Am Born 16, 5451 Horhausen/Westerwald, Fed. Rep. of Germany

[21] Appl. No.: 201,361

[22] Filed: Oct. 27, 1980

[30] Foreign Application Priority Data

Nov. 6, 1979 [DE] Fed. Rep. of Germany ....... 2944757

[51] Int. Cl.³ .......................................... G06F 15/46
[52] U.S. Cl. .................................... 364/200; 364/140
[58] Field of Search ... 364/200 MS File, 900 MS File, 364/140

[56] References Cited

U.S. PATENT DOCUMENTS 3,729,716 4/1973 Arulpragasam et al. ........... 364/200

Primary Examiner—Raulfe B. Zache
Attorney, Agent, or Firm—Steinberg & Raskin

[57] ABSTRACT

A main memory of a process control computer is directly connected to a data input/output unit, and, via a separate address processor, to an address memory. A clock generator is connected to a program memory and the address memory and supplies sequential clock pulses for the execution of the program and for the simultaneous delivery of addresses in each program step. The main memory, which stores the data from the data input/output unit ater the feeding of the addresses from the address processor, supplies the data for the program step to an arithmetic logic unit, which simultaneously receives pulse-frequency driven operation commands from the program memory and feeds the operation results to the data input/output unit and/or to the main memory for storing. A program step counter connected to the program memory continues switching the program steps and controls the output of the operation commands from the program memory. The data bus of the computer is separated from the address bus thereof.

24 Claims, 7 Drawing Figures

PROCESS CONTROL COMPUTER WHEREIN DATA AND ADDRESSES ARE SEPARATELY PROCESSED

BACKGROUND OF THE INVENTION

The invention relates to a process control computer. More particularly, the invention relates to a pulse-frequency driven process control computer which sequentially processes data and control informations as is common in microprocessors. The computer of the invention is primarily suited for the control of industrial machinery and industrial plants.

More and more microprocessors are presently being used to control industrial machinery and plants, since they operate rapidly and offer the advantage that the control thereof may easier be influenced and altered via the program than is the case with stationary mechanical or electrical hardware control. Furthermore, the components of a microprocessor system are relatively inexpensive, particularly in case of mass production.

In the control of industrial machinery or plants by microprocessors or process control computers, it is desired that operation, that is, programming and data input, be easy and uncomplicated to also enable unskilled personnel to operate the device. The more precise the time sequence of the operation is to be controlled, the more data is commonly to be processed within a shorter time. It is therefore additionally desired that the microprocessor or the process control computer operate very rapidly.

SUMMARY OF THE INVENTION

The principal object of the invention is to provide a process control computer which operates rapidly and is particularly simple to program as well as to operate.

This problem is solved by a sequentially pulse-frequency driven process control computer, which comprises a main memory, a program memory and an address memory. The main memory is directly connected to a data input/output unit and, via a separate address processor, to the address memory. A clock generator is connected to the program memory and supplies sequential clock pulses for the execution of the program. The main memory, which stores the data from the data input/output unit after the feeding of the addresses from the address processor, supplies the data for the program step to an arithmetic logic unit which simultaneously receives pulse-frequency driven operation commands from the program memory and supplies the operation results to the data input/output unit and/or to the main memory for storing. A program step counter connected to the program memory continues stepping the program steps and controls the output of the operation commands from the program memory.

In the process control computer of the invention, the data bus is separated from the address bus. The data bus is provided for data only and is never loaded with addresses. By providing a separate address processor, data and addresses can separately be processed.

In the prior art microprocessors, a command cycle operates, for example, as follows. The address waiting for the following command to be executed is output from a command address counter, for example, to a ROM, which thereupon transfers the command to the command register of the central unit. When the command has been decoded as to the required data and interpreted, the data is requested for example from a RAM storage location and is fed to the arithmetic unit for execution of the operation ordered by the command, whereupon the result is further processed.

In the process control computer of the present invention, in contrast with the prior art computers, the data and addresses are separately processed. The address required in the instant pulse is taken by the address processor from the address memory, processed and fed to the main memory. In addition, the data, which is to be processed arrives via the data input unit at the main memory and is fed, in a pulse-frequency driven manner, to the arithmetic logic unit. The arithmetic logic unit receives the operation command, directly and pulse-frequency driven, from the program memory and can instantly execute the desired operation. After the transfer of the operation command, it need therefore no longer be interpreted in order to query the necessary data from any storage location. Execution of the operation is therefore very rapid. Also, after the completion of the operation, the result can instantly be fed to the data output unit via the data bus, which is free for output, since said data bus is not loaded with addresses for new commands.

A program step counter consecutively calls up the individual program steps and controls the output of the operation commands from the program memory. The program step counter is coupled with a program step register, which serves as a jump register. The jump register receives jump instructions from a jump instruction logic of the arithmetic logic unit. The jump instruction logic receives jump conditions, directly and pulse-frequency driven, from the program memory. Therefore, if the result of the operation in the arithmetic logic unit underlies a jump condition, a jump instruction is output, via the jump register, to the program step counter, which then directly jumps to the program step waiting in the jump register and in this location consecutively calls up the following program steps until the next jump instruction is issued.

It has been shown to be of advantage to provide a jump cycle counter which controls the number of jump repetitions or jump loops. In the control of industrial machinery it is frequently necessary to repeat a program step, or a sequence of program steps, respectively, several times. This is permitted with ease by the jump cycle counter, while no time consuming deciding operations have to be introduced.

It is also of advantage to sub-divide the address memory into submemories, which in the present case are designated for simplicity sake by A, B, C, . . . . If there are, for example, three sub-memories A, B and C, said sub-memories are successively called up in each program step in the order A, B, C. The address processor first processes address A and feeds the resultant address to the main memory, which passes the data stored under this address to the arithmetic logic unit. The addresses B and C are successively processed in the same manner and the result of the operation within the arithmetic logic unit is re-stored in the main memory.

Since the data (A) and (B) is statically processed in the arithmetic logic unit, but arrives successively from the address processor, the arithmetic logic unit includes two intermediate memories, in which the data is received and waits during the course of the residual time of the program step, or until the next change, respectively.

The address processor operates in the simplest modification with the following commands, which the program memory requests from the present program steps:

1. Direct passing on of addresses A, B and C to the main memory and, if a respective command is waiting, storing the addresses in a register for later use.

2. Summation of the addresses A, B and C with the corresponding addresses of a called-up register without restoring the result.

3. Summation of the addresses, as in Operation 2, including, however, re-storage of the result in the called-up register.

Therefore, the address processor preferably includes a plurality of address registers, such as, for example, four.

The arithmetic logic unit may be a common logic circuit. It is, however, preferred that at least the jump instruction logic be a constant value memory, in which the jump conditions are stored in form of a table. Non-erasable or erasable read-only memories, so-called ROMs or EPROMs are utilized as constant value memories. The addresses and/or jump conditions from the program memory waiting at the constant value memory indicate the storage location at which the desired result may be found. The desired result is then output as the jump instruction.

In another preferred embodiment, the arithmetic logic unit comprises essentially only constant value memories, in which tables are stored, apart from intermediate memories, which may be used. Preferably, the arithmetic logic unit includes three ROMs, two ROMs of which include data for linking data (A) and (B) and the third ROM of which includes the jump instruction logic. The two ROMs for the linking are supplied, if necessary, via intermediate memories with the data from the main memory and the operation commands from the program memory via control inputs. The result is queried from the storage locations so addressed in the tables, the result is queried and further processed, or fed to the data output unit, respectively.

In a preferred embodiment of the process control computer of the invention, the data (A) and (B) are 4 bit data, of which only 3 bits of each are fed to the first ROM and processed in it, while the 4th bit of each is fed to the second ROM. The result of the linking of the first 3 bits of data (A) with the first 3 bits of data (B) in the first ROM is supplied as a 4-bit information to the second ROM. The operation commands from the program memory are fed to the two ROMs each by 4 bit control inputs. In this manner, in each of the two ROMs, 16 tables each having a 64 digit matrix, or 1024 storage locations, may be addressed. Since the first three bits in the BCD code and in the binary code are identical, the fourth bit is suitably used to determine whether the result is binary or BCD. This information is therefore fed by the fourth bit to the second ROM, wherein it is decided whether the operation is binary or in the BCD code, that is whether the result of the linking of the data in the first ROM is binary or in the BCD code.

In the case of internal logic or arithmetic operations, the arithmetic logic unit operates exclusively with the main memory where the data is taken from addresses A and B, processed, and, if necessary, re-stored under address C. Identical addresses may be used as well as the addresses A, B and C.

Data from the address B, for example, remains unconsidered if only the sign of an arithmetic operation is required or if only the inverted sign of data (A) is required, etc.

Sometimes it will be necessary to decode the operation command and/or the jump conditions after they had been output by the program memory, so that they can be processed by the arithmetic logic unit and/or the jump instruction logic. In this case, a decoder is provided either in the program memory output or in the input of the arithmetic logic unit, or the jump instruction logic, respectively.

It has also been shown to be suitable to provide, at the data output in the data bus, an intermediate memory, to which the arithmetic logic unit feeds the operation result. This intermediate memory serves as a time "buffer" and is always available for the arithmetic logic unit after the completion of its operation when it outputs, pulse-frequency driven, its result. The data output of the arithmetic logic unit is open only for the output of the result and is otherwise blocked. The data bus is thus instantly free and the contents of the intermediate memory may, if necessary, be emptied into the peripheral units.

In another advantageous embodiment of the invention, a transfer unit, which permits access from the outside to the address processor, is provided between the data bus and the address processor. The transfer unit, which provides the linkage between the data bus and the address processor, or between the address processor and the data bus, respectively, has additional advantages if, for example, a plurality of process computers should correspond with each other. The transfer unit permits the use of the same program part for processing different data, which is separately stored, and if necessary may be called up by external commands of if special conditions so require.

In another advantageous embodiment of the process control computer of the invention, a control output, from which a control signal may directly be emitted to the peripheral units of the processor, is provided at the program memory. The control signal may be co-programmed in each program step and thus constitutes a fixed portion of the program step.

A clock generator controls the entire process control computer. The clock generator preferably includes the common TTL, or transistor transistor logic, technique and includes an oscillator, which feeds stepping pulses to a shift register. The output of the shift register is invertedly connected to the input of the shift register. An L pulse arriving at the output of the shift register acts invertingly upon the input of said shift register, so that the consecutive pulses pass through the shift register as H pulses. On the other hand, an H pulse arriving at the output acts so invertingly upon the input of the shift register that the consecutive pulses pass the shift register as L pulses. If the shift register has n locations, n L pulses alternate with n H pulses at the output of the clock generator.

A maximum of n pulses, or cycles, constitute one program step. If a program step is to comprise n pulses, the last required output of the shift register is invertedly connected with the input of the shift register. One program step then has utilized only as many pulses as the number of digits employed by the shift register. Such an alteration of the program step period may easily be made without decoding. The process computer may therefore very easily be adapted to other components or elements, which may, for example, operate more rapidly.

If, for example a 10 megacycle oscillator is employed together with a 40 digit shift register as the clock generator, the 10 megacycle pulses each having a period of 0.1 μs will generate program steps having a period of 4 μs, by combining 40 pulses to constitute one program step. Due to the program step period of 4 μs, 250,000 arithmetic operations per second may be executed while storage at any storage location is possible.

Such a high computing speed permits very precise control of industrial machinery commonly operated by motors. Furthermore, the structure of the process control computer is such that operation is in machine code. The computer may therefore be easily programmed, which is necessary for the control of industrial plants or industrial machinery. In addition, the structure of the computer is so simple that, by exchanging a few ROMs, the program may be changed relatively easily and even the program step period may be altered, as hereinbefore stated.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
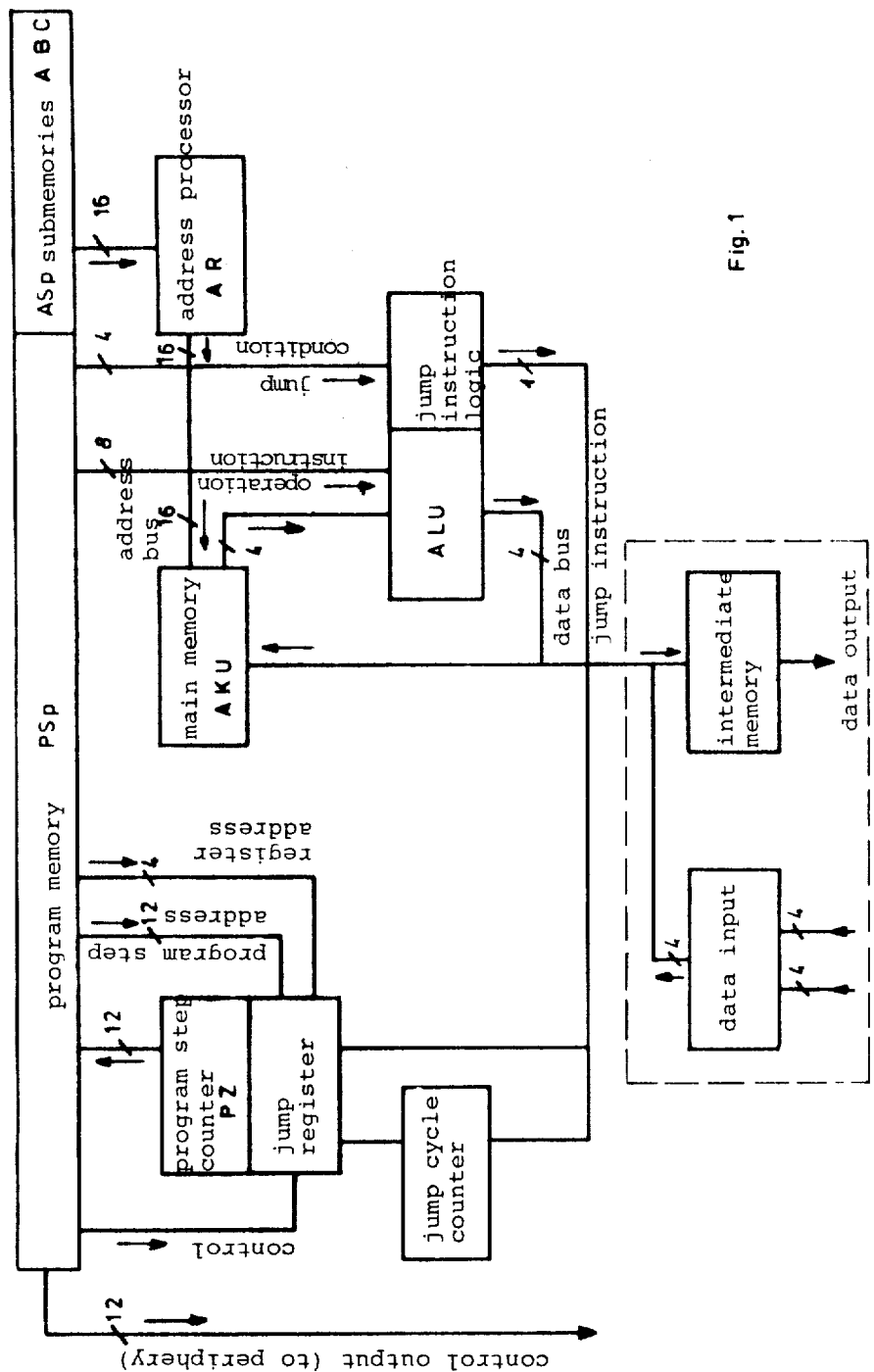
FIG. 1 is a block diagram of an embodiment of the process control computer of the invention.

FIG. 1 shows an embodiment of the process control computer of the invention. The program is stored in the program memory PSp and the address memory ASp. The address memory ASp is connected via a 16 bit address bus to an address processor AR, which supplies the required addresses via a 16 bit line to the main memory, or accumulator, AKU. The data to be processed is transferred from the data input/output unit I/O to the main memory AKU and stored under the address given by the address processor AR.

The main memory AKU consists of one, or a plurality of, read/write memories, commonly termed "RAM". The commands, jump conditions and similar data required for the execution of the program are stored in the program memory PSp. The operation commands are fed directly to the arithmetic logic unit ALU via a decoder, if necessary. In FIG. 1, an eight bit line is provided for transferring the operation command.

The data to be processed, which has been stored in the main memory AKU, is transferred to the arithmetic logic unit ALU via the 4 bit data bus and is processed in accordance with the operation command. The result is fed from the arithmetic logic unit ALU via the 4 bit data bus to the data input/output unit I/O, where it is further processed in accordance with the specific purpose desired. In addition, it may be necessary to store the result in the main memory AKU. In such case, the result is additionally fed, via the data bus, to the main memory AKU.

The arithmetic logic unit ALU possesses a jump instruction logic to which the jump condition is directly, or if necessary via a decoder, supplied from the program memory via a 4 bit line. If processing of the data in the arithmetic logic unit ALU shows that a jump has to be made, a jump instruction is fed to a jump register, into which the address of the program step had been previously read by the program memory $PS_p$, to which the jump is to be made. A 1 bit control line is commonly sufficient for the jump instruction.

The execution of the program, that is, the program flow, is controlled by a clock generator, which feeds clock pulses to the corresponding components of the processor. In an example hereinafter described in detail, the length of one pulse is 0.1 μs and 40 pulses are combined to constitute one program step of 4 μs. Although arithmetic operations comprising 40 pulses are commonly sufficient for the control of industrial machinery, it is, of course, possible for longer or simpler arithmetic operations to combine more or less pulses, respectively, to constitute one program step or to utilize a plurality of program steps.

A program step counter PZ controls the program steps, particularly the reading out of the operation command, the jump instruction, etc. from the program memory $PS_p$ to the arithmetic logic unit ALU and the jump instruction logic and the reading out of the addresses to the address processor AR for the present program step. If there is no jump instruction, the flowing active program continues. If a jump instruction is waiting, the program step counter is advised via the jump register which program step should be jumped to.

At the beginning of a program step, the address processor AR reads from the address memory $AS_p$ addresses which are processed to become addresses under which the data to be processed in the present program step are stored in the main memory AKU. Thereupon, this data is successively read into the arithmetic logic unit ALU, processed, that is, linked with each other, and at the end of the program step the result is fed, pulse-frequently driven, via the data bus to the data output unit I/O and/or the main memory AKU. The data and its addresses are thus separately processed and coordinated in accordance with the pulse control.

Figure 2:
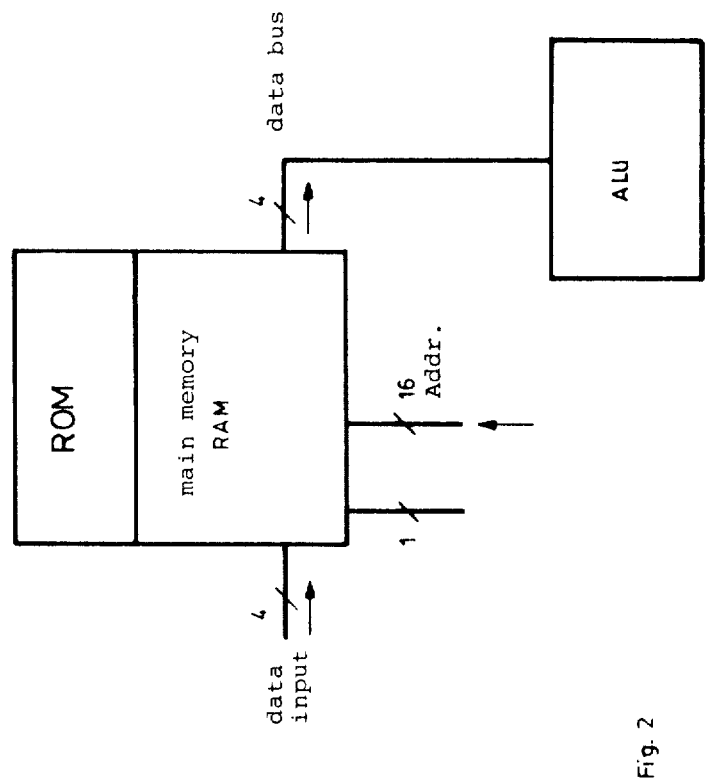
FIG. 2 is a block diagram of an embodiment of the main memory of the process control computer of FIG. 1

Although the essential portion of the main memory AKU consists of one RAM or a plurality of RAMs, in another embodiment of the invention, an additional one or a plurality of ROMs, or read-only memories), are provided in said memory. An embodiment of the main memory AKU is shown in FIG. 2. Apparatus constant values, nominal values, constants, and the like, which are required for linking the varying data, may be stored in the additional ROM, for example.

In the embodiment of FIG. 1 of the process control computer of the invention, the address memory $AS_p$ is sub-divided into three sub-memories A, B, C. Programming is simplified by this sub-division, since data (A), which corresponds to addresses A is successively first read out into the arithmetic logic unit ALU and is linked with data (B), which corresponds to addresses B, in said logic unit. If the result is to be stored, it is stored in the main memory AKU under an address C.

Figure 3:
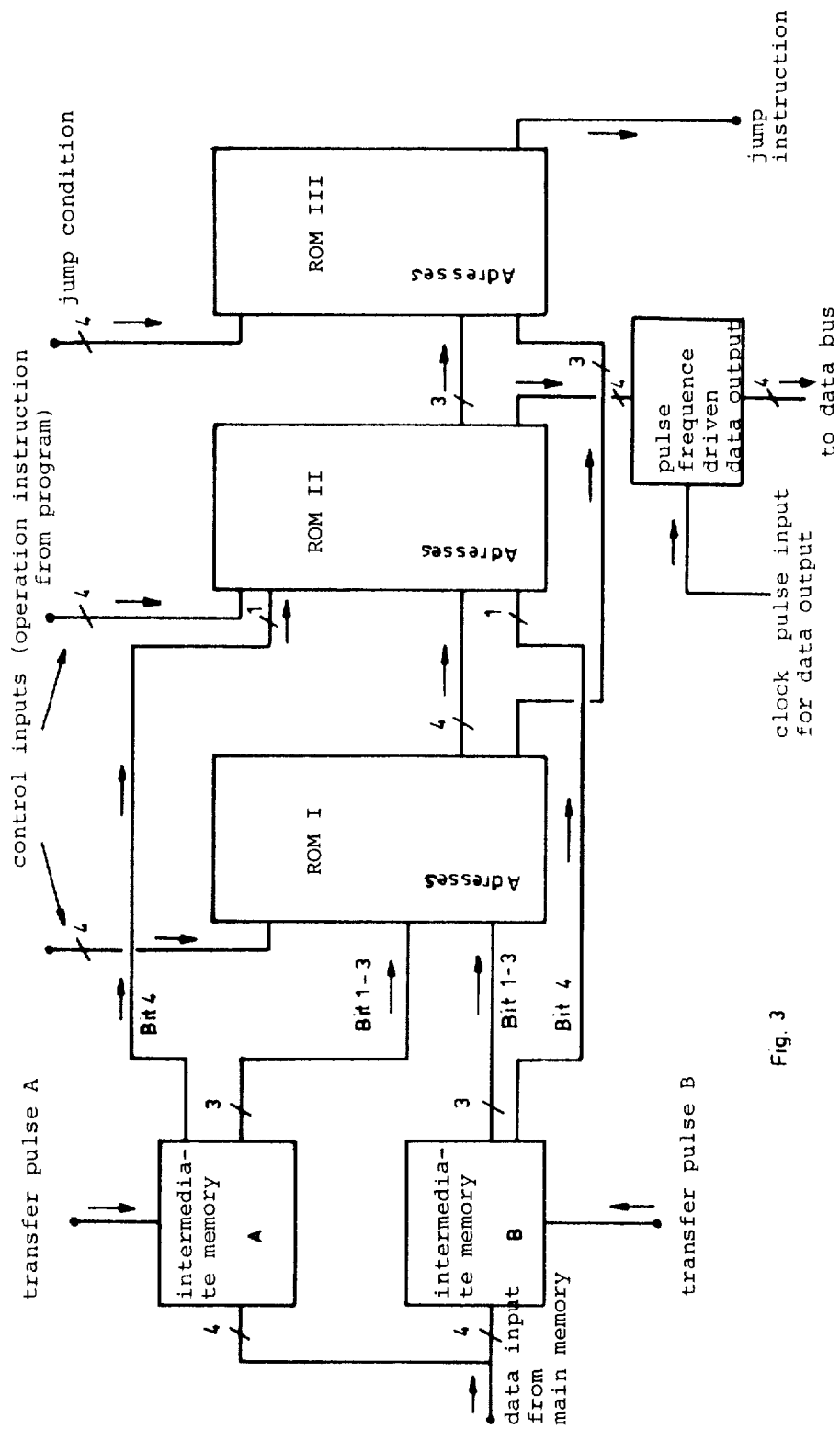
FIG. 3 is a block diagram of an embodiment of the arithmetic logic unit of the process control computer of FIG. 1.

FIG. 3 shows an embodiment of the arithmetic logic unit ALU of the process control computer of the invention. The arithmetic logic unit ALU consists essentially of three read-only memories ROM I, ROM II and ROM III, to which are transferred, via two intermediate memories A and B, the data (A) and (B) to be processed from the main memory AKU while the operation commands are directly received, inclusive of the jump conditions, directly from the program memory $PS_p$. The data is stored in the read-only memories ROM I, ROM II and ROM III in the form of tables, which may be called up as the results of logic linkages. When data (A) has successively arrived at the intermediate memory A and the intermediate memory B from the main memory AKU, it is available for static processing. Pulse frequency driven, each of the first 3 bits of the 4 bit data is subsequently fed to the read-only memory ROM I and indicates a storage location in a table matrix. The pulse-frequency driven operation command received simultaneously from the program memory $PS_p$ designates the table in which the correct matrix storage location is to be found. The result of this linkage of data (A) and (B) is fed as a 4 bit information to the read-only memory ROM II. In the read-only memory ROM II, the fourth bit of each of data (A) or (B) respectively indicates whether the result from the read only memory ROM I constitutes a binary or a BCD information. The result is then, pulse-frequency driven, transferred via the 4 bit data bus to the data output unit I/O to be further processed. The result, or an intermediate result, is additionally fed to the read-only memory ROM III which includes the jump instruction logic. The read-only memory ROM III decides whether or not a jump condition fed from the program memory $PS_p$ to said ROM III is fulfilled. The result, which is commonly a 1 bit jump instruction, is transferred to the jump register. The data output is only pulse-frequency driven open when a result is output. The remaining time, the data output is blocked.

In the embodiment of FIG. 1, the jump register includes 16 locations and is filled with a 4 bit address. The address of the program step to which, if necessary, a jump has to be made, such as a 12 bit information, is read in to the jump register beforehand. If the arithmetic logic unit ALU decides that no jump is to be made, the program step counter PZ counts on and moves to the next step. The jump register can only read out from the program memory $PS_p$ and cannot write thereinto.

The jump register is provided with a jump cycle counter (FIG. 1), which receives its stepping pulses from the control program and initiates, when reaching the number of cycles fed-in before, an unconditioned jump to a program step, which is stored at a determined location in the jump register.

Figure 5:
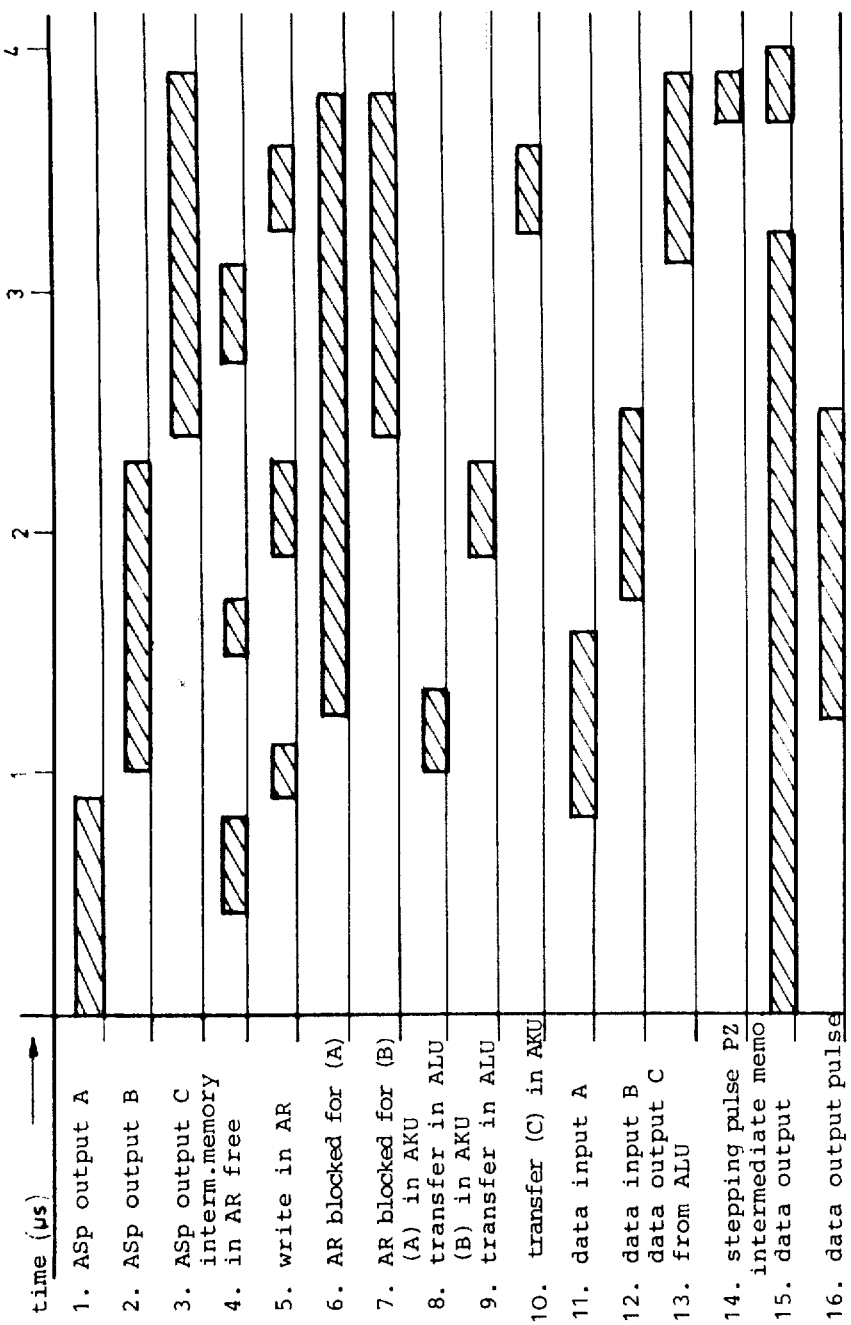
FIG. 5 is a graphical presentation explaining the execution of the program of the computer of FIG. 1.

FIG. 5 graphically illustrates the execution of the data processing in the arithmetic logic unit ALU. In FIG. 5, 1. is the address memory $AS_p$ output for address A,
2. is the address memory $AS_p$ output for address B,
3. is the address memory $AS_p$ output for address C,
4. is the time the intermediate memory in the input of the address processor AR is free,
5. is the time the address register can be written into,
6. is the time a part of the address processor AR is no longer open for data (A),
7. is the time a part of the address processor AR is no longer open for data (B),
8. is the writing of data (A) into the main memory AKU and its transfer to the arithmetic logic unit ALU,
9. is the writing of data (B) into the main memory AKU and its transfer to the arithmetic logic unit ALU,
10. is the transfer of data (C) into the main memory AKU,
11. is the data input A,
12. is the data input B,
13. is the data output C from the arithmetic logic unit ALU,
14. is the stepping pulse of the program step counter PZ,
15. is the inverse state of the intermediate memory in the data output I/O, and
16. is the pulse, or cycle, for data output to the periphery.

In the beginning of a program step having 40 pulses, the address processor AR calls up the address of data (A) in the main memory AKU so that this data is read into the arithmetic logic unit ALU, specifically, into the intermediate memory A thereof. During the course of the transfer pulse, the data is later released from the intermediate memory for processing in the read-only memories ROM I or ROM II, respectively. The address of data (B) is previously called up in the main memory AKU, whereupon such data is read into the intermediate memory B of the arithmetic logic unit ALU and is then also waiting at the address inputs of the read-only memories ROM I and ROM II, respectively.

After processing by means of the tables stored in the read-only memories ROM I and ROM II, the result, which is data C, is available at the output of the ALU arithmetic logic unit and is in due course released, pulse-frequency driven, to the data bus. As "data C," the result may be read into the main memory AKU under an address C of said main memory calculated parallel in time. The other hand, the result is transferred to the data output unit I/O. If, as in the example shown, only one data bus constitutes the connection from the data input/output unit I/O to the main memory AKU and to the arithmetic logic unit ALU, the data bus should be emptied as rapidly as possible after loading with the data. For this reason, the intermediate memory is provided in the data output and receives, pulse-frequency driven, the result and passes it to the periphery before the completion of the next program step. The data output to the periphery therefore remains stable for the maximum possible period of a program step and can easier be processed by the on-line periphery.

The intermediate storage is necessary because the data output by the address processor cannot be directly accepted by the periphery because of the necessarily longer line distances. In the aforedescribed exemplified embodiment, the total period of a program step is only 4 μs, that is, the data is output at a frequency of 250 kHz.

Figure 4:
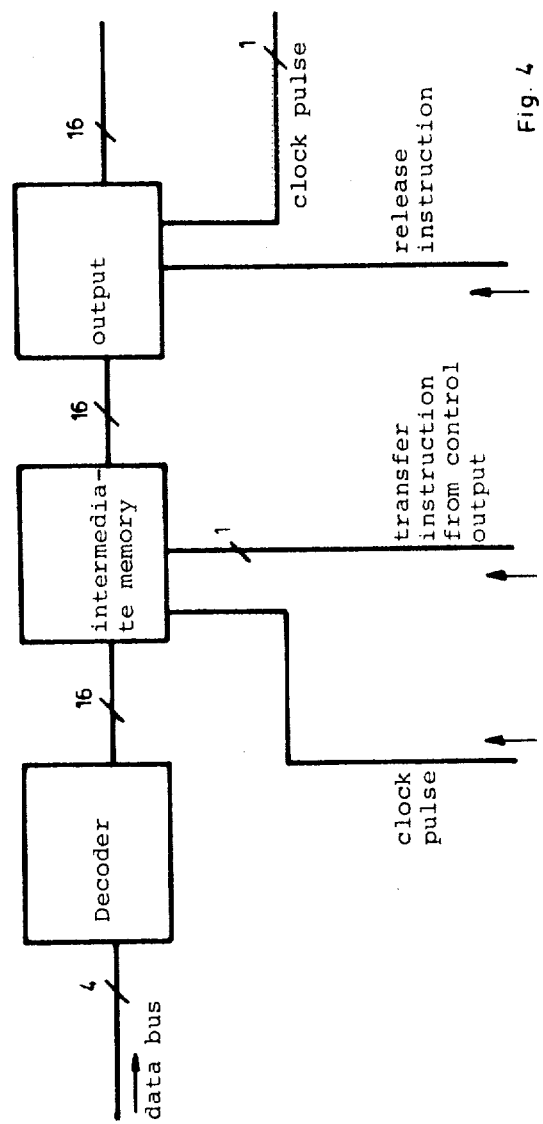
FIG. 4 is a block diagram of an embodiment of the data output of the process control computer of FIG. 1.

FIG. 4 shows part of the periphery via which data is output. The 4 bit data output by the arithmetic logic unit ALU via the intermediate memory is decoded in a decoder and fed to the intermediate memory 2 via a 16 bit line. At a predetermined pulse 16 in FIG. 5, there is a transfer to the final data output unit I/O, which outputs pulse-frequency driven, control signals, if necessary, via power amplifiers, power converters, transducers, or the like, to the machine or plant to be controlled. A control output from the program memory $PS_p$ comprising, for example, 12 bits and leading to the periphery of the process conrol computer, provides for the allocation of the results of the arithmetic operation. It indicates, for example, where the data from the data bus should be stored, which data is concerned, which digit or place value this data constitutes, that is, ones, tens, hundreds, thousands, etc.

Since the data bus is emptied as rapidly as possible, the main memory AKU may receive data via the data input unit during the course of a program step, as well. This data may be stored in the main memory AKU as A data or B data, respectively. This data input is compiled, for example, by measured actual values from the periphery.

In any case, the address processor AR regulates the storage in and the output of data from the main memory AKU.

Figure 6:
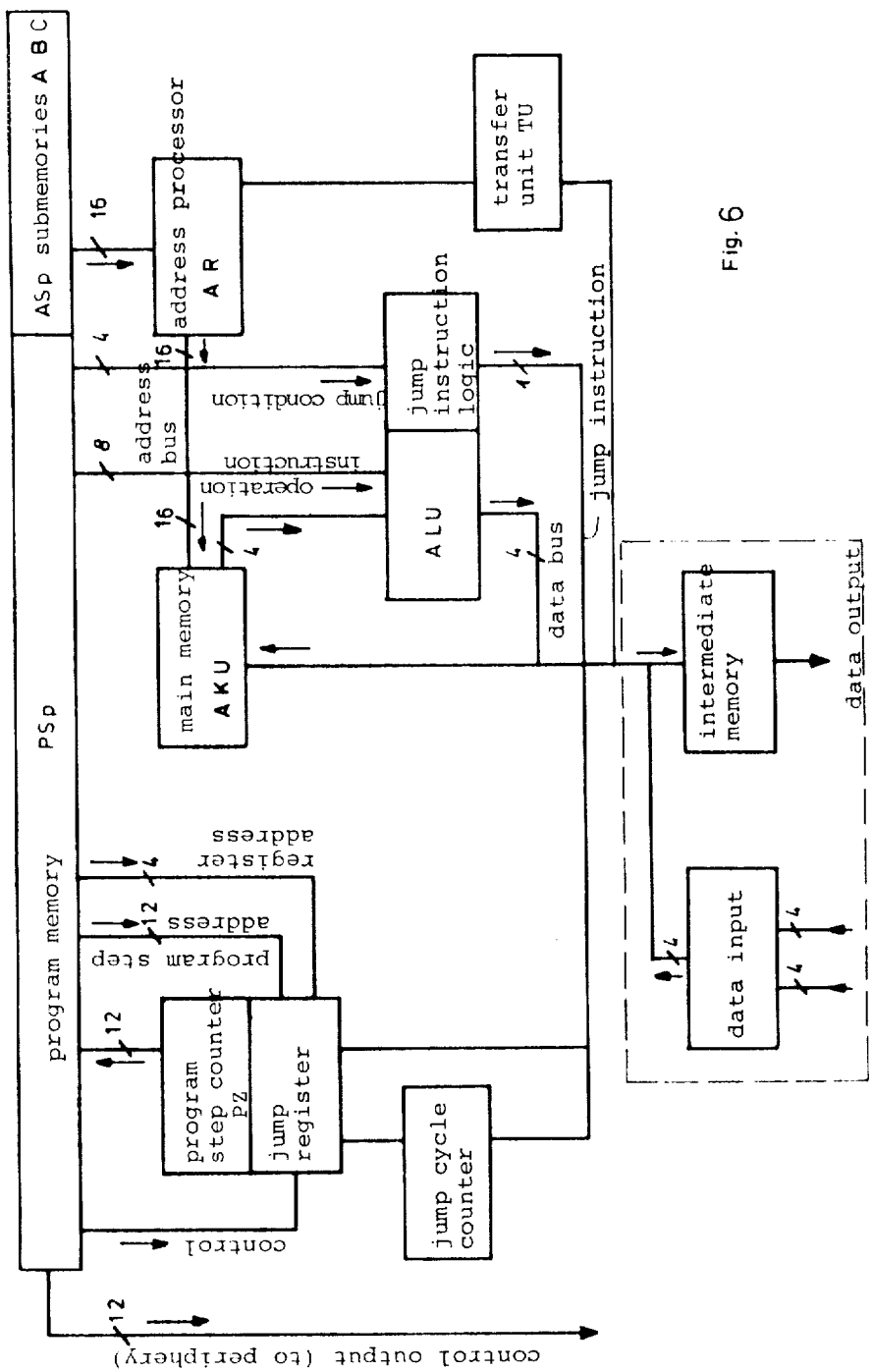
FIG. 6 is a block diagram of another embodiment of the process control computer of the invention.

FIG. 6 shows another embodiment of the process control computer of the invention. A transfer unit TU is connected between the data bus and the address processor AR and provides a connection between said data bus and said address processor. This facilitates external access to the address processor AR, which is of importance particularly for communication of a plurality of process control computers. In special cases, when correspondence between a plurality of process control computers is desired, for example, the additional transfer unit TU has the advantage, among others, that identical program sections may be used for processing different data, which is stored separately and may be called up by external commands or, under special conditions, if so desired.

The program memory $PS_p$ preferably has only read-only memories or ROMs, which are set to a constant program. The read-only memories may be used as plug-in cards. The range of application of the process control computer may, however, be broadened, since instead of the read-only memories or ROMs, erasable read-only memories or "EPROMs" may be utilized.

It should, however, be decided in each individual case, whether it is more important to obtain a multilateral range of application of the process control computer or whether easier operation and simplicity is to be preferred. The more possibilities there are, the more difficult it is to write a program. Frequently, the desire for simple programmability is predominant in practice.

The computer has a simple structure, since it has only one main memory, and there are no intermediate memories assigned to the main memory. Since the main memory AKU has a direct access, it operates particularly rapidly. However, only one address can be called up at one time.

Although the process control computer of the invention has been described in detail in connection with a 4 bit computer, it is understood that the invention is not restricted to 4 bit computers. The computer may be extended in the same manner, for example, to 8 bit, 24 bit, etc. computers.

Figure 7:
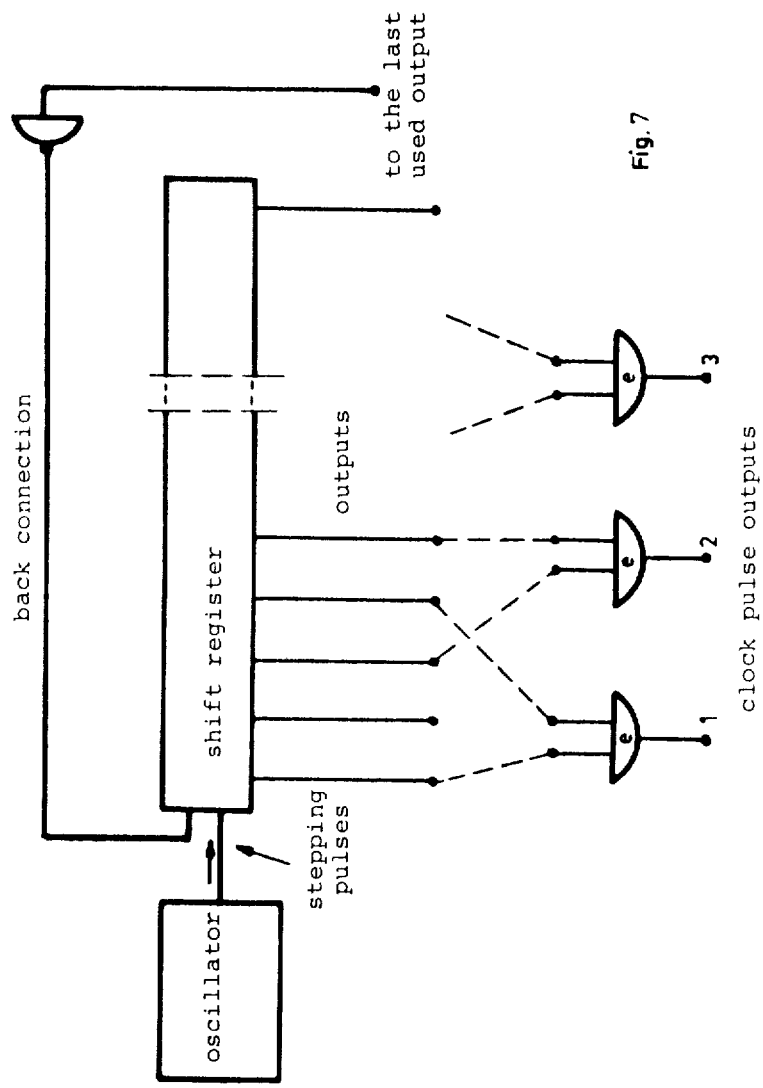
FIG. 7 is a block diagram of an embodiment of the clock generator of FIG. 1.

Any suitable known clock generator may be utilized as the clock generator for the clock-pulse-controlled timing of the process control computer of the invention. However, because of their long operation time periods, the prior art clock generators are too slow. In the process control computer of the invention, since the structure permits a particularly rapid operation, the clock generator of FIG. 7 is utilized. The clock generator of FIG. 7 utilizes the transistor transistor logic, or TTL, technique. An oscillator having an oscillation frequency of 10 MHz supplies stepping pulses to a shift register, which possesses, for example, 40 digits, if one program step is to have 40 pulses. The 10 MHz pulses from the oscillator are fed to the shift register and pass through it.

The output of the shift register is invertedly connected to the input of the shift register. Thus, for example, an L pulse arriving at the output of the shift register acts invertingly on the input of the shift register, so that the successive pulses pass the shift register as H pulses. After the 40th pulse, the first H pulse has passed the shift register, has arrived at the output of said shift register and then acts, on its part, invertingly on the input of said shift register so that 40 L pulses thereupon pass said shift register. Correspondingly, the output of the shift register is successively 40 L pulses, 40 H pulses, 40 L pulses, etc. Each total of 40 pulses, including identical H pulses, or L pulses, respectively, constitutes one program step.

If it is desired that one program step include less pulses, whereby the program step frequency may be increased, inversion is after an earlier pulse. That is, one output of the shift register between output 1 and output 40 such as for example output "25", is invertingly connected to the input of the shift register. The program step length then includes less pulses; in this case, 25 pulses. One pulse each of the pulses that form one program step is needed for switching further stepping of the program and particularly of the program step counter PZ. The first or last pulse of a program step is suitably used therefor.

The outputs of the clock pulse are connected to the outputs of the exclusive OR gates, or logic antivalence elements, of the shift register. When 20 exclusive OR gates are connected to the 40 outputs of the shift register, for example, 20 clock pulse outputs are obtained behind said OR gates. 20 exclusive OR gates are commercially available on a circuit board which may be utilized in the clock generator.

The switching time of the exclusive OR gates amounting to about 12 to 15 ns during switch-on or switch-off, respectively, is negligible. Furthermore, switch-on and switch-off times compensate each other so that the pulse period remains constant. The clock generator utilized in the process control computer of the invention is more rapid and more stable than common clock generators. In the examples given, 40 pulses are generated from the 10 mHz pulses, each having a period of 0.1 μs to constitute a program step having a period of 4 μs. The oscillator may be constructed in the usual manner; that is, it may generate the frequency by an oscillator crystal or an astable multivibrator. The oscillator preferably includes Schmitt triggers, so that the clock generator comprises only a few different elements.

In any event, the oscillator should be structured so that the process control computer of the invention has the fewest number of different elements as possible in order to reach an almost identical temperature dependence and a substantially identical time constant. If all the components essentially have identical temperature dependence and an identical time constant, the individual pulse period may vary, which, however, has no harmful effect on the operation of the process control computer as a whole.

The process control computer of the invention is utilized for the control of motors for processing workpieces. The control problems encountered in mechanical engineering relate mostly to cases where the sequence or run essentially determined in advance of a process, or a plurality of processes, is to be controlled and wherein externally introduced measured quantities, reference values or other parameters should influence this process. The problem is always the same, though varying in details. In most cases, it is the purpose of the computer to compare two words of, for example, 4 bits, with each other in order to obtain a control signal from the comparison. To accomplish this, a reference function or arithmetic function is stored in the computer by which it is possible to obtain data comparable with each other.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A sequentially pulse-frequency driven process control computer, comprising
   a data input/output unit;
   an address memory;
   a separate address processor;
   an address bus;
   a main memory directly connected to said data input/output unit and, via said address processor and said address bus, to said address memory;
   a program memory;
   a clock generator connected to said program memory and said address memory and supplying sequential clock pulses for the execution of the program and for the simultaneous delivery of addresses in each program step;
   a data bus separate from said address bus;
   an arithmetic logic unit, said main memory storing the data from said data-output unit after the feeding of the addresses from said address processor supplying the data for the program step to said arithmetic logic unit via said data bus, said arithmetic logic unit simultaneously receiving pulse-frequency driven operation commands from said program memory and feeding the operation results via said data bus to said data input/output unit and to said main memory for storing; and
   a program step counter connected to said program memory and continuing switching of the program steps and controlling the output of the operation commands from said program memory.

2. A process control computer as claimed in claim 1, further comprising a jump register connected to said program memory and charged with program steps of a jump by said program memory, and wherein said arithmetic logic unit includes a jump instruction logic circuit connected to said program memory for receiving a jump condition from said program memory and for issuing a jump instruction to said jump register, which passes said jump instruction to said program step counter.

3. A process control computer as claimed in claim 1, wherein said arithmetic logic unit comprises a plurality of substantially constant value memories in which tables are stored.

4. A process control computer as claimed in claim 1, wherein said results from said arithmetic logic unit are directly fed to said data input/output unit as a control signal.

5. A process control computer as claimed in claim 1, further comprising a decoder, and wherein said results from said arithmetic logic unit are fed to said data input/output unit via said decoder.

6. A process control computer as claimed in claim 1, wherein said data input/output unit includes a digital/analog converter and a power amplifier.

7. A process control computer as claimed in claim 1, wherein said data input/output unit includes an analog-digital converter.

8. A process control computer as claimed in claim 1, wherein said program memory includes a control output from which a control signal is directly transmitted to peripheral units of said computer, said control signal constituting a programmable section of the program step.

9. A process control computer as claimed in claim 1, wherein said clock generator comprises an oscillator and a shift register having a first input connected to said oscillator, a second input and an output invertingly connected to said second input.

10. A process control computer as claimed in claim 1, further comprising a transfer unit connected between said data bus and said address processor for permitting access to said address processor from outside.

11. A process control computer as claimed in claim 1, wherein said arithmetic logic unit comprises arithmetic units, an input from said main memory, an intermediate memory in said input for data (A) and an intermediate memory in said input for data (B), into said main memory feeding the data (A) and (B) correspondingly called up into said intermediate memories, so that said intermediate memories keep the data static for passing them to the arithmetic units of said arithmetic logic unit, and wherein said address memory is sub-divided into three sub-memories A, B and C and said address processor consecutively calls up addresses (A), (B) and (C) in said main memory under which data (A), (B) and (C) is stored, and wherein data (A) from said main memory in said arithmetic logic unit is linked with data (B) from said main memory and the result is read into address (C) of said main memory.

12. A process control computer as claimed in claim 2, further comprising a jump cycle counter connected between said jump instruction logic circuit and said jump register for controlling the number of jump repetitions and receiving its stepping pulses from said control program, said jump cycle counter beginning, when the predetermined number of cycles has been obtained, an unconditioned jump to a program step stored at a determined location in said jump register.

13. A process control computer as claimed in claim 2, wherein said jump instruction logic circuit comprises a constant value memory in which jump conditions are stored in the form of tables.

14. A process control computer as claimed in claim 2, wherein said program memory feeds pulse-frequency driven operation commands for linkage to said arithmetic logic unit and said jump condition to said jump instruction logic circuit.

15. A process control computer as claimed in claim 3, wherein said arithmetic logic unit comprises more than three constant value memories connected in series and a first of said constant value memories executes a first linkage of data fed to said arithmetic logic unit and feeds the result to the next-succeeding one of said constant value memories for processing together with additional data and control informations fed to said arithmetic logic unit, each consecutive one of said constant value memories processing the result of the next-preceding one of said constant value memories.

16. A process control computer as claimed in claim 4, wherein said input/output unit includes an intermediate memory for providing data to be issued for output when called up.

17. A process control computer as claimed in claim 9, further comprising a plurality of exclusive OR gates having outputs constituting said clock pulse outputs, and wherein said shift register has a plurality of additional outputs connected to said exclusive OR gates.

18. A process control computer as claimed in claim 9, wherein said oscillator comprises Schmitt triggers.

19. A process control computer as claimed in claim 9, wherein said oscillator has a frequency of 10 mHz and said shift register has 40 digits so that a clock pulse period of 0.1 μs and a program step period of 4 μs are obtained.

20. A process control computer as claimed in claim 9, wherein one of the outputs of said clock pulse is connected to said program step counter for step switching to a further program step.

21. A process control computer as claimed in claim 11, wherein said arithmetic logic unit further comprises three read-only memories, two of which contain data for the linkage of data (A) and (B) and the third of which includes said jump instruction logic circuit.

22. A process control computer as claimed in claim 17, wherein said output of said shift register is invertingly connected back to said second input of said shift register and the remaining ones of said plurality of outputs of said shift register remain unused.

23. A process control computer as claimed in claim 21, wherein said arithmetic logic unit comprises a plurality of constant value memories and wherein each of data (A) and (B) are 4 bit data, of each of which only 3 bits are fed to, and processed in, a first of said constant value memories and the 4th bit of each is directly fed to a second of said constant value memories, and the result from said first constant value memory is supplied as a 4 bit information to said second of said constant value memories.

24. A process control computer as claimed in claim 23, wherein each of said first and second of said constant value memories has a 4 bit control input directly connected to said program memory and receives, pulse-frequency driven, operation commands from said program memory.

* * * * *